United States Patent
Aunstrup et al.

[15] 3,674,643
[45] July 4, 1972

[54] PREPARATION OF PROTEOLYTIC ENZYMES HAVING MAXIMUM ACTIVITY AT HIGH ALKALINITY

[72] Inventors: Knud Aunstrup, Farum; Otto Andresen, Copenhagen; Helle Outtrup, Vaerlose, all of Denmark

[73] Assignee: Novo Terapeutisk Laboratorium A/S, Copenhagen, Denmark

[22] Filed: Nov. 1, 1968

[21] Appl. No.: 772,830

[30] Foreign Application Priority Data

Nov. 10, 1967 Great Britain ................... 51,307/67

[52] U.S. Cl. ............................................ 195/62, 195/66 R
[51] Int. Cl. ................................. C12d 11/00, C12d 13/10
[58] Field of Search ............................................ 195/66 R, 62

[56] References Cited

UNITED STATES PATENTS 2,530,210  11/1950  Smythe et al. ................... 195/66 UX

*Primary Examiner*—A. Louis Monacell
*Assistant Examiner*—James R. Hoffman
*Attorney*—Synnestvedt & Lechner

[57] ABSTRACT

A method of making proteolytic enzyme preparations having maximum activity at high alkalinity by submerged aerobic cultivation of strains of *Bacillus alcalophilus* in a nutrient medium containing assimilable carbon and nitrogen sources, while maintaining the pH-value of the nutrient medium between 7.5 and 11.

3 Claims, No Drawings

PREPARATION OF PROTEOLYTIC ENZYMES HAVING MAXIMUM ACTIVITY AT HIGH ALKALINITY

The present invention relates to a process of making novel proteolytic enzyme preparations for industrial use.

It is known that a number of bacteria produce proteolytic enzymes during their metabolism, and some of these bacteria have been cultivated on an industrial scale for the purpose of recovering the proteolytic enzymes produced.

In the Dutch periodical "Antonie van Leeuwenhoek," 1, 141–147 (1934), A. Vedder described his experiments to isolate certain bacteria from feces. By enrichment in alkaline peptone water and cultivation on what he called "glycocoll plates" containing hemoglobin, KOH, glycocoll and peptone-agar, or better "carbonate plates" containing hemoglobin, $K_2CO_3$, $KHCO_3$ and peptone agar, Vedder succeeded in isolating 16 strains of a bacterium belonging to the genus Bacillus, and being considered by Vedder to belong to a novel species which he called Bacillus alcalophilus because this species did only grow at pH values above 7, preferably within the range of 8.6 to 10. This species Bacillus alcalophilus was incorporated in the 6th edition of Bergey's Manual of Determinative Bacteriology, but not in the 7th edition.

One strain of Bacillus alcalophilus was deposited by Vedder with National Collection of Type Cultures in London under the NCTC-number 4553 and the same strain was later in 1956 deposited with National Collection of Industrial Bacteria in Edinburgh under the NCIB number 8772, where the strain by a mistake is considered as a Bacillus subtilis.

As the species alcalophilus was first isolated by Vedder, it will in the following be called Bacillus alcalophilus Vedder.

It has now been found that during their metabolism the strains of the species Bacillus alcalophilus Vedder produce novel proteolytic enzymes extracellularly, that such enzymes may be recovered from the cultivation media and that they show a pronounced activity at high alkalinities, which makes them useful within various industrial fields.

The process according to the invention is characterized by cultivating a strain of Bacillus alcalophilus Vedder under submerged aerobic conditions in a nutrient medium containing assimilable carbon and nitrogen sources, maintaining the pH value of the nutrient medium between 7.5 and 11, and recovering the proteolytic enzyme produced extracellularly during the cultivation.

The nutrient medium is composed in agreement with the principles of the known art. Suitable assimilable carbon sources are carbohydrates, such as saccharose, glucose, starch, cereal grains, malt, rice, sorghum etc. The carbohydrate concentration may vary within rather wide limits, e.g., up to 25 percent and down to 1–5 percent, but usually 8–10 percent would be suitable, the percentage bein calculated as dextrose. It has been found that the presence in the nutrient medium of carbohydrates will give rise to the formation of acidic components, resulting in a decrease of the pH value during the cultivation. As it is essential to maintain a pH value of the nutrient medium within the range of 7.5 to 11, preferably 8 to 10, during the cultivation, measurements should be taken that the pH value does not fall below that range for any essential period during the cultivation. In order to keep the pH value within the required range, a limited amount of carbohydrates may be used together with a buffer substance which is able to maintain the required pH value. Carbonates, and particularly sesquicarbonates, used in a concentration of up to 0.2 M in the medium, are able to create a pH-value of about 9.3 to 10.5, respectively.

Also other buffer systems, such as phosphate buffers, may be used.

It is also possible to initiate the cultivation with a low carbohydrate content and to add small amounts of carbohydrates successively during the cultivation.

A third possibility is to make use of automatic pH control by addition of various basic-reacting substances used in this art.

The use of carbonates and aesquicarbonates as pH controlling substances is very useful and it is surprising that it is possible during the cultivation on an industrial scale to use these compounds in the concentrations referred to.

The nitrogen source in the nutrient medium may be of inorganic and/or organic nature. Suitable inorganic nitrogen sources are nitrates and ammonium salts, and among the organic nitrogen sources there are quite a number known for use in fermentation processes and in the cultivation of bacteria. Illustrating examples are soybean meal, cotton seed meal, peanut meal, casein, corn steep liquor, yeast extracts, urea, albumine etc.

Besides, the nutrient medium should contain the usual trace substances.

The temperature at which the cultivation takes place is normally within the same range as in the known cultivation of known species of the genus Bacillus. Usually a temperature between 25° and 40° C is convenient. The temperature is preferably 30° to 37° C.

As the cultivation has to be carried out under aerobic conditions, it is, when using fermentation tanks, necessary to make use of artificial aeration. The amount of air is similar to that used in the known cultivation processes.

In general, maximum yields of the proteolytic enzymes will be obtained after a cultivation time of 1 to 5 days.

For cultivation with proteolytic enzyme production and recovery in view, use has been made of the deposited strain from both of the collections referred to above, viz, strain NCTC 4553 and NCIB 8772. These strains show optimal growth at a pH value within the range of 7.8 and 9.0. The cultivation has been carried out both in shake flasks and in pilot plant fermentors with artificial aeration. The yields obtained have been determined by the well-known Anson hemoglobin method, cfr. Journal of General Physiology, 22, 79–98 (1939). One Anson unit means throughout this specification the amount of proteolytic enzyme digesting hemoglobin at a pH value of 10.1 and a temperature of 25° C during a reaction time of 10 minutes with such an initial velocity that per minute there is formed an amount of split products which cannot be precipitated with trichloracetic acid that these split products give the same color with phenol reagent as does one milliequivalent of tyrosine.

For cultivation the following two media were used:

1. Medium BPFA with the following composition:

| | |
|---|---|
| Potato flour | 50 g per liter of tap water |
| Saccharose | 50 g per liter of tap water |
| Barley flour | 50 g per liter of tap water |
| Soybean meal | 20 g per liter of tap water |
| Sodium caseinate | 10 g per liter of tap water |
| $Na_4HPO_4 \cdot 12H_2O$ | 9 g per liter of tap water |

2. Medium BSX with the follow composition:

| | |
|---|---|
| Barley flour | 100 g per liter of tap water |
| Soybean meal | 30 g per liter of tap water |

Both these media were adjusted to the desired pH value by the addition of sesquicarbonate or soda under sterile conditions.

The experiments in shake flasks were carried out in 500 mm shake flasks, each of the flasks containing 100 ml of the nutrient medium BPFA and BSX, respectively, which were sterilized beforehand by autoclaving for 90 minutes at 120° C, and after the autoclaving the pH value was adjusted to 9.3–10.3 by addition of sodium carbonate or sodium sesquicarbonate in a concentration of 0.2 M and 0.1 M, respectively. There were used four flasks for each bacterium, and samples from the culture media for determining the enzyme content expressed in Anson units were taken after cultivation in 3, 4, 5, and 6 days, respectively. The flasks were during the cultivation placed on a rotating table with 220 revolutions per minute, and the temperature during the cultivation was 30° C.

The maximum proteolytic activity measured in Anson units per kg of the nutrient medium appears from Table I below.

TABLE I

| Bacillus alcalophilus Vedder | Nutrient medium | Maximum proteolytic activity Anson units per kg | Final pH value |
|---|---|---|---|
| NCIB 8772 | BPFA | 14 | 7.7 |
|  |  | 25 | 7.7 |
|  | BSX | 6 | 8.8 |
|  |  | 2.5 | 8.2 |
| NCTC 4553 | BPFA | 16 | 7.9 |
|  |  | 13 | 7.6 |

By fractionated precipitation with ethyl alcohol enzyme preparations in powder form were prepared as it appears from the following Table II.

TABLE II

| Bacillus alcalophilus Vedder |  | NCIB 8772 | NCTC 4553 |
|---|---|---|---|
| Starting material | kg of culture broth | 0.10 | 0.25 |
|  | Anson units per kg | 7.6 | 12 |
|  | Anson units in total | 0.76 | 3 |
| 1st precipitation | g Kieselguhr | 3 | 0.75 |
|  | ml $C_2H_5OH$ | 150 | 385 |
| 2nd precipitation | g Kieselguhr | 2.5 | 3 |
|  | ml $C_2H_5OH$ | 370 | 770 |
| Yield | g powder | 4.4 | 5.3 |
|  | Anson units per g (measured at pH 10.1) | 0.14 | 0.3 |
|  | Anson units in total | 0.62 | 1.6 |
|  | % | 81 | 53 |

The strain NCIB 8772 has also been cultivated in 550 liters stainless steel tanks under submerged conditions and artificial aeration while using 250 liters of the nutrient medium BPFA referred to above. The pH value of the medium was adjusted on 10.2. by sterile addition of 15 liters of 2 M soda solution. The temperature during the cultivation was 30° C, the velocity of the agitator 570 rpm and the aeration 0.25 m³ air per minute. After a cultivation period of 110 hours the pH value of the cultivation broth was 8.9 and the proteolytic activity was 17 Anson units per kg, measured at pH 10.1.

The enzyme preparations produced by the processes described above have been tested in regard to the proteolytic activity against hemoglobin at different pH values and different temperatures.

The activity was measured at pH 7, 7.5, 8, 9, 10, 11, and 12 at 25° C, and expressed in percentage of maximum activity. The results are compiled in Table III below.

TABLE III

| | | | pH-value | | | | |
|---|---|---|---|---|---|---|---|
| 7 | 7.5 | 8 | 9 | 10 | 11 | 12 | |
|  |  | 50 |  | 75 | 85 | 100 |  |
| NCIB 8772 | 33 | 54 | 67 | 71 | 85 | 100 | |
|  |  | 44 |  | 70 | 80 | 100 | |
| NCTC 4553 | 34 | 52 | 64 | 72 | 79 | 100 | |

The activity was also measured at a constant pH value of 10.1 and varying temperatures, viz, 25, 37, 50, 60, 66, and 75 degrees of Celsius. The results of these measurements are compiled in Table IV below.

TABLE IV

| | Temperature °C | | | | | |
|---|---|---|---|---|---|---|
| 25 | 37 | 50 | 60 | 66 | 75 |
| NCTC4553 % activity at pH 10.1 14 | 32 | 65 | 100 | 26 | 2 |

In general, the enzyme preparations produced according to the invention consist of a solid or liquid mixture of the proteolytic enzymes produced according to the invention and other components the amount and composition of which depend on the purpose and technical or scientific field within which the enzyme compositions are to be used. When the enzyme preparations or compositions according to the invention are in solid form they can consist of granules into which the enzymes are incorporated, for instance together with other enzymes or substances having other than enzymatic activity useful for the utility of the enzyme compositions. When the enzymes are not used in crystalline form, they may be accompanied by impurities of organic nature, such as proteins and carbohydrates from the culture medium. The enzyme powders may contain stabilizers. The enzyme compositions in liquid form can constitute solutions or suspensions which may contain stabilizers, if necessary.

Usually, the novel enzymes of the invention are used in small quantities. In view thereof the enzyme preparations or compositions for industrial use normally show an enzyme content not exceeding about 10 percent by weight. In some cases, however, the enzyme content may be considerably higher.

The novel enzymes according to the invention can for instance be used in washing compositions, dehairing compositions, in preparations for hydrolysis of proteins, in dish-washing compositions and as additives to septic tanks and installations for purifying sewage.

The enzyme powder produced from strain 8772 as described above has been used in washing experiments which were carried out while using EMPA test strips or swatches No. 116 soiled with blood, milk, and carbon black.

The detergent used had the following composition:

| | |
|---|---|
| Dodecylbenzenesulphonate (50%) | 20 g |
| Nonylphenol, 9.5 EO | 5 g |
| Sodiumtripolyphosphate | 30 g |
| Sodiumcarbonate, anhydr. | 15 g |
| CMC (45%) | 2 g |
| Sodiumsulphate, anhydr. | 28 g |

The washing conditions were as follows:

| | |
|---|---|
| Hardness of water in German units | 10° |
| Fabric to water ratio | 1:20 |
| Time of experiment | 30 minutes |
| pH-value | about 10 |
| Detergent concentration | 4.8 g per liter of washing solution |
| Proteolytic activity measured at pH 7.5 | 0.04 Anson unit per liter of washing solution |
| Washing temperature | 60° and 70° C |

The washing process carried out at 60° C was as follows:

By means of a pipette 20 ml of a solution prepared from the enzyme powder referred to above and showing a temperature of 20° C, a pH value of 11.2 and a proteolytic activity of 0.24 Anson unit per liter were added a 200 ml beaker. At zero time there were added 100 ml detergent solution adjusted to to pH 11.3 and 68° C. The mixture was immediately transferred to a 200 ml long-necked Erlenmeyer flask placed on a shaking table and submerged in water kept at 60° C. Beforehand said flask contained 6 EMPA strips 116 weighing in total 3.0 g. The shaking was continued during the washing period of 30 minutes. Then the washing solution was separated, and the pH value was measured after cooling. The test strips were rinsed and rubbed between the fingers under the hot water tap. All test strips were subjected to remission measurements in a Beckman spectrophotometer at 460 m$\mu$.

In the experiments carried out at 70° C the detergent solution had a temperature of 80° C.

In addition to these experiments control experiments were carried out in which the enzyme solution was replaced by water.

Moreover, all the experiments were carried out while using an addition of 1 g of perborate (NaBO$_3$, 4H$_2$O ) per liter of washing solution.

The results of these experiments are compiled in the following Table V

TABLE V

| | without perborate | | with perborate |
|---|---|---|---|
| | 60°C | 70°C | 60°C |
| Enzyme powder NCIB 8772 | 54.7 | 49.2 | 41.5 |
| Control without enzyme | 46.7 | 46.2 | 31.5 |

The remission values are average figures of measurements of each of the six test strips in each of the experiments.

What we claim is:

1. A process of making proteolytic enzyme preparations, characterized by cultivating *Bacillus alcalophilus Vedder* under submerged and aerobic conditions in a nutrient medium containing assimilable carbon and nitrogen sources, maintaining the pH value of the nutrient medium between 7.5 and 11, and recovering the proteolytic enzyme produced extracellularly during the cultivation.

2. The method according to claim 1 wherein the cultivation is carried out using a strain of bacterium of the genus Bacillus NCIB No. 8772.

3. Proteolytic enzyme preparations produced by the method of claim 1.

* * * * *

UNITED STATES PATENT OFFICE
CERTIFICATE OF CORRECTION

Patent No. 3,674,643          Dated July 4, 1972

Inventor(s) Knud Aunstrup et al

It is certified that error appears in the above-identified patent and that said Letters Patent are hereby corrected as shown below:

Column 2, line 34, change "79-78" to read --79-89--

Column 3, line 65, change Table III to read:

Table III

|          |    |      | pH-value |    |                |                |                   |
|----------|----|------|----|----|----------------|----------------|-------------------|
|          | 7  | 7.5  | 8  | 9  | 10             | 11             | 12                |
| NCIB 8772 | 33 | 50<br>44 | 54 | 67 | 75<br>71<br>70 | 85<br>85<br>80 | 100<br>100<br>100 |
| NCTC 4553 | 34 |      | 52 | 64 | 72             | 79             | 100               |

Signed and sealed this 1st day of May 1973.

(SEAL)
Attest:

EDWARD M. FLETCHER, JR.      ROBERT GOTTSCHALK
Attesting Officer             Commissioner of Patents